Sept. 15, 1931.  A. J. PASCARELLA  1,823,664
CIRCUIT MAKER AND BREAKER
Filed March 4, 1930
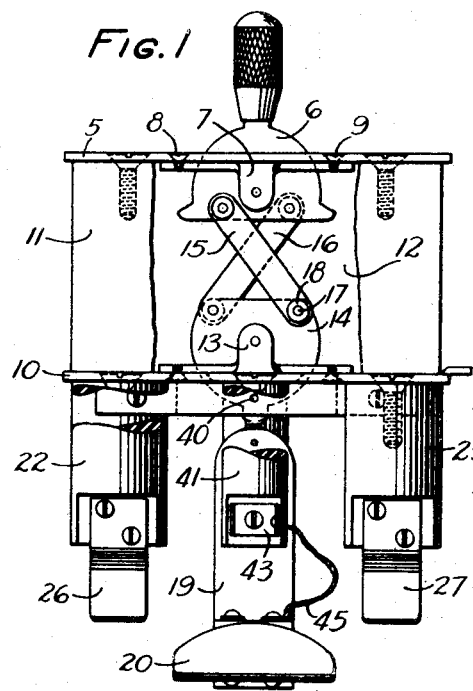
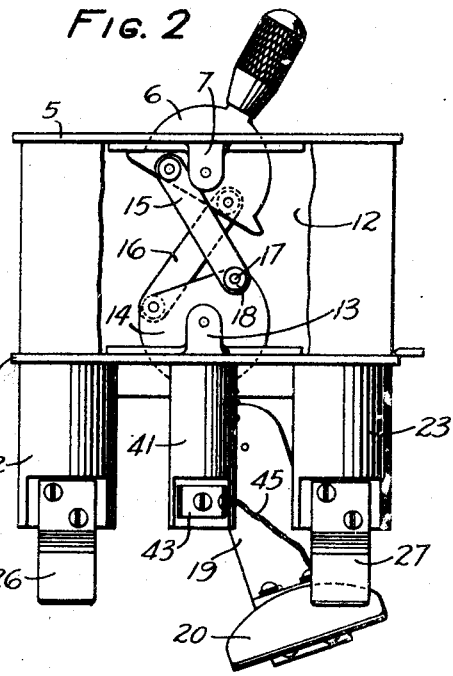
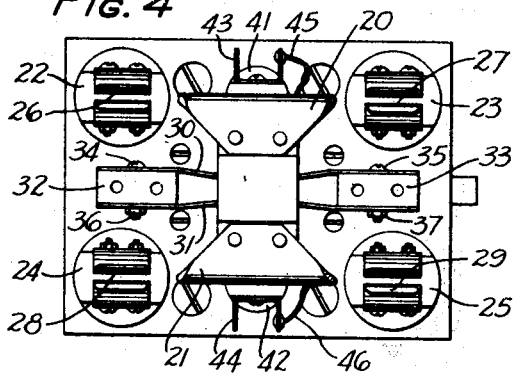
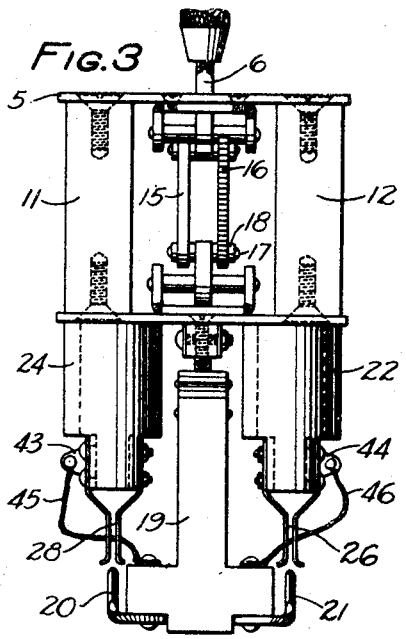
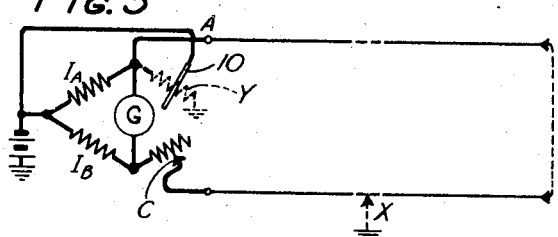
INVENTOR
A. J. PASCARELLA
BY John A. Hall
ATTORNEY Patented Sept. 15, 1931

1,823,664

UNITED STATES PATENT OFFICE

ANTHONY J. PASCARELLA, OF WEST ENGLEWOOD, NEW JERSEY, ASSIGNOR TO BELL TELEPHONE LABORATORIES, INCORPORATED, OF NEW YORK, N. Y., A CORPORATION OF NEW YORK

CIRCUIT MAKER AND BREAKER

Application filed March 4, 1930. Serial No. 433,000.

This invention relates to circuit makers and breakers and more particularly to highly insulated switches suitable for controlling testing circuits.

In electrical circuits generally, and telephone circuits particularly it is necessary that periodic tests be made to determine whether or not the circuits are operating at a maximum efficiency, and to locate and rectify unstandard conditions which may be present and which tend to disrupt the efficient operation of equipment associated with the circuits. Current leaks in telephone cable circuits which constitute not an uncommon source of trouble, if allowed to persist, would seriously impair the transmission characteristics of the circuits and it requires constant vigilance to guard against the growth of such conditions.

Various testing circuits for locating current leaks in telephone cables are in general use, and in order that such circuits serve their purpose to a high degree of accuracy, it is necessary that the equipment employed with such circuits be of such a design as to offer no low resistance current paths which would affect the accuracy of the measurements made.

It is the object of this invention to insure against leakage currents in apparatus employed in locating faults in telephone cables.

This object is attained in accordance with a feature of the invention by the provision of a circuit switch which is not only highly insulated but which is also quickly and conveniently operated, is durable, compact and simple in construction.

In switches of the character herein disclosed, it is necessary that a current leakage guard be employed, and the contact members be located at a relatively great distance from the guard in order to insure adequate resistance to current leaks. It is also necessary that the contacts themselves be sufficiently segregated to prevent leaks therebetween. In order to satisfy these requirements heretofore, a long movable arm which supported the active or movable contact member, and which served as a means for making contact with the passive contacts, was essential. This resulted in a cumbersome switch structure and one which, due to its inherent lack of proportion in design was unreliable in operation and frequently in need of adjustment.

The switch proposed by this invention embodies a link mechanism interposed between the operating lever and the movable or active contact carrying arm and so proportioned relatively to the movable arm as to insure the necessary movement of the latter and still maintain sufficient resistance throughout the switch structure as to reduce to a minimum the possibility of current leakage between the different elements of the switch.

The invention will be readily understood from the following detailed description made with reference to the accompanying drawings in which Fig. 1 is a front elevation of a switch embodying the features of this invention showing the link mechanism with the operating lever in normal position; Fig. 2 is a similar view to that of Fig. 1, showing the switch in an operated position; Fig. 3 is a side elevation of the switch shown in Figs. 1 and 2; Fig. 4 is a bottom plan view of the switch and Fig. 5 shows schematically, a Wheatstone bridge testing circuit of which the switch shown in Figs. 1 to 4 inclusive, forms a part when the bridge is employed in testing a telephone toll line.

Referring to Figs. 1 to 4 inclusive, like numerals throughout the several views indicating similar parts, a mounting plate 5 is provided with a centrally located slot through which an operating lever 6 extends. The lever 6 is pivotally mounted on the mounting bracket 7 which is secured to plate 6 by means of the screws 8 and 9, there being four such screws in all, only two being visible in Fig. 1. Interposed between the mounting plate 5 and a guard element 10 are two rectangular insulating blocks 11 and 12 which serve to insulate the guard from the mounting plate. These blocks are designed to present a resistance in the neighborhood of ten thousand megohms to any leakage currents between the guard 10 and the mounting plate 5.

A mounting bracket 13, similar to the bracket 7 is secured to the guard 10 and serves as a pivot mounting for the lever 14.

Diagonally disposed links or crank arms 15 and 16, of insulating material interconnect the levers 6 and 14 and are secured thereto in any suitable manner, preferably as shown, by means of a screw-pin 17 and nut 18.

Secured to that portion of lever 14 extending through the guard 10 is a substantially T-shaped insulating arm 19 which carries the contact members 20 and 21. The T-shaped arm 19 and contact members 20 and 21 constitute the active or movable element of the switch.

Four terminal posts 22, 23, 24 and 25 are mounted on the guard 10 and carry the contact springs 26, 27, 28 and 29, respectively. These posts with their respective contact springs constitute the passive or stationary contacts of the switch.

Two spring members 30 and 31, normally tensioned towards each other are mounted on blocks 32 and 33 by means of screws 34, 35 and nuts 36, 37. At their mid-points the springs 30 and 31 are embossed to provide small projections 40 which fit into corresponding indentures in the lever 14 for the purpose of insuring a positive normal or center position of the active contact member 19.

Terminal posts 41 and 42 are mounted on the guard 10 and are provided with terminals 43 and 44 respectively to which the leads from an external circuit may be connected. Flexible leads 45 and 46 interconnect the contacts 43 and 20, and 44 and 21.

It is apparent from the construction of applicant's switch that current leakage is reduced to a minimum, also that by virtue of the link mechanism interconnecting the operating lever and the active or movable contact member, applicant has devised a switching mechanism in which a relatively short active contact member may be employed and at the same time permitting the passive contacts to be sufficiently separated to insure adequate insulation. This construction results in a small, compact and highly efficient switch, and obviates the necessity for a long, unwieldly active contact element which was common to such types of switches heretofore and which resulted in huge, cumbersome and impractical structures. By virtue of the link mechanism joining the active contact member with the operating lever, the angular displacement of the former bears a definite relation to that of the latter.

Referring to Fig. 5, there is disclosed a simple Wheatstone bridge circuit which is generally employed in testing telephone toll lines and with which the switch hereinbefore described finds particular application. This circuit arrangement has been disclosed for the purpose of describing the use of a guard in the switch structure.

The circuit shown to the right of terminals A, B represents a telephone toll line and the ground X indicates the location of an unstandard condition on this line. Assuming the apparatus associated with the Wheatstone bridge to be impervious to current leaks, which is the ideal condition, the currents $I_A$ and $I_B$ would be equal, and by adjusting the movable arm C a balance, as indicated by the galvanometer G, may be obtained. Then by a series of computations well known to Wheatstone bridge circuits, the exact location of the current leak X may be obtained. Should the equipment be poorly insulated and unguarded, a leak to ground represented at Y might occur. It is obvious that the current $I_A$ will be increased by the current flow through Y to ground. This causes an unbalance in the circuit and in order to restore the balance the movable arm C would have to be adjusted until the galvanometer G read zero. This causes an inaccurate location of the leak X to be computed, rendering the test wholly unreliable. However, when the equipment is guarded by the shield 10 the leakage current, instead of finding a ready path to ground, is rendered ineffective in producing any appreciable effect on the galvanometer reading. The path through the insulating elements of the switch which has been purposely designed to present a high resistance, generally in the neighborhood of ten thousand megohms, is now connected in parallel with the arm of the Wheatstone bridge through which the current $I_A$ is flowing. For practical purposes the resistance of this arm is designed to be five thousand ohms so that the result of paralleling a five thousand ohm resistance with a resistance of ten thousand megohms produces a negligible effect on the current $I_A$ so that the galvanometer reading is not affected and a true location of the leak X may be calculated.

What is claimed is:

1. In a switching mechanism, a mounting plate, an operating lever pivotally mounted on said mounting plate, a second mounting plate, a contact carrying lever pivotally mounted on said second mounting plate, stationary contacts and a link joining diagonally disposed points on said operating lever and said contact carrying lever and adapted to impart the movement of said operating lever to said contact carrying lever to cause the latter to engage said stationary contacts.

2. In a switching mechanism, a mounting plate, an operating lever pivotally mounted on said mounting plate, a second mounting plate insulatively separated from said first mounting plate, a plurality of downwardly extending binding posts terminating in stationary contacts mounted on said second mounting plate, a contact carrying lever pivotally mounted on said second mounting plate and a crank arm interconnecting diagonally disposed points on said operating lever and said contact carrying lever and adapted to transmit the angular movement of said operating lever to said contact carrying lever to effect the engagement of said contact carrying lever with said stationary contacts.

3. In a highly insulated switching mechanism, a mounting plate, stationary contacts, a current conducting guard interposed between and insulated from said mounting plate and said stationary contacts, an operating lever mounted on said mounting plate, a movable contact carrying member and means intermediate said lever and contact carrying member for transmitting the movement of said operating lever to said contact carrying member in a certain predetermined ratio to effect the engagement of said contact carrying member with said stationary contacts.

4. In a switching mechanism, a stationary contact, a movable contact member, an operating lever for effecting the engagement of said movable contact member with said stationary contact, a link mechanism interposed between said movable contact member and said operating lever for transmitting the movement of said operating lever to said movable contact member and a current conducting guard intermediate said stationary contact and said link mechanism.

In witness whereof, I hereunto subscribe my name this 3 day of March, 1930.

ANTHONY J. PASCARELLA.